US009140389B2

(12) United States Patent
Moreira De Carvalho et al.

(10) Patent No.: US 9,140,389 B2
(45) Date of Patent: Sep. 22, 2015

(54) GRAPHENE-BASED STEEL TUBES, PIPES OR RISERS, METHODS FOR THE PRODUCTION THEREOF AND THE USE THEREOF FOR CONVEYING PETROLEUM, GAS AND BIOFUELS

(75) Inventors: André Luis Moreira De Carvalho, Ponta Grossa (BR); Nadia Khaled Zurba, Fortaleza (BR)

(73) Assignee: STATE UNIVERSITY OF PONTA GROSSA, Parana (BR)

( * ) Notice: Subject to any disclaimer, the term of this patent is extended or adjusted under 35 U.S.C. 154(b) by 4 days.

(21) Appl. No.: 14/124,966

(22) PCT Filed: Nov. 4, 2011

(86) PCT No.: PCT/BR2011/000415
§ 371 (c)(1),
(2), (4) Date: Dec. 9, 2013

(87) PCT Pub. No.: WO2012/167336
PCT Pub. Date: Dec. 13, 2012

(65) Prior Publication Data
US 2014/0144541 A1    May 29, 2014

(30) Foreign Application Priority Data
Jun. 7, 2011   (BR) ...................................... 1102980

(51) Int. Cl.
*B32B 15/02*   (2006.01)
*F16L 9/02*    (2006.01)
(Continued)

(52) U.S. Cl.
CPC . *F16L 9/02* (2013.01); *B22D 25/02* (2013.01); *B22F 5/106* (2013.01); *B82Y 30/00* (2013.01);
(Continued)

(58) Field of Classification Search
None
See application file for complete search history.

(56) References Cited

U.S. PATENT DOCUMENTS 6,358,298 B1 *  3/2002  Gagne et al. ..................... 75/243
8,053,069 B2 * 11/2011  Katagiri et al. ............. 428/293.1
(Continued)

FOREIGN PATENT DOCUMENTS

BR    PI08045771 A2    7/2010
BR    PI08056331 A2    9/2010
(Continued)

OTHER PUBLICATIONS

Boukhvalov, D.W. and Katsnelson, M.I. Chemical functionalization of graphene. Journal of Physics: Condensed Matter, v.21, n.34, 2009. http://iopscience.iop.org/0953-8984/21/34/344205.

*Primary Examiner* — Humera Sheikh
*Assistant Examiner* — Seth Dumbris
(74) *Attorney, Agent, or Firm* — Fraser Clemens Martin & Miller LLC; Jacob M. Ward

(57) ABSTRACT

The present invention relates to new graphene-based steel tubes, pipes or risers, whose products are obtained by a method of manufacturing that consists in adding graphene nanosheets, heat treatment, forming tubular geometry and surface finish. In addition to the unique chemical composition based on graphene, with carbon content ranging between 0.01 and 21.0%, these products have the wall thickness between 800 nm and 80 mm (from ultra fine to thick), diameter between 10 and 5000 mm, and having a tensile strength not less than 2000 MPa reaching up to 50 GPa, with far superior features to those obtained by other methods. Such products can be used for petroleum, natural gas and biofuels transportation, including in deepwater submarine riser systems (>1500 m), with direct application in the oil industry.

20 Claims, 5 Drawing Sheets

(51) Int. Cl.
| | |
|---|---|
| B82Y 30/00 | (2011.01) |
| C22C 38/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/46 | (2006.01) |
| C22C 38/50 | (2006.01) |
| C22C 38/52 | (2006.01) |
| C22C 38/56 | (2006.01) |
| B22F 5/10 | (2006.01) |
| C22C 26/00 | (2006.01) |
| C22C 33/02 | (2006.01) |
| B22D 25/02 | (2006.01) |
| C01B 31/02 | (2006.01) |
| C01B 31/04 | (2006.01) |
| C01B 31/06 | (2006.01) |
| B22F 3/24 | (2006.01) |

(52) U.S. Cl.
CPC ......... *C01B 31/0213* (2013.01); *C01B 31/0226* (2013.01); *C01B 31/04* (2013.01); *C01B 31/0484* (2013.01); *C01B 31/06* (2013.01); *C22C 26/00* (2013.01); *C22C 33/0228* (2013.01); *C22C 38/001* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/50* (2013.01); *C22C 38/52* (2013.01); *C22C 38/56* (2013.01); *B22F 2003/242* (2013.01); *B22F 2998/10* (2013.01); *C22C 2026/001* (2013.01); *C22C 2026/002* (2013.01); *Y10T 137/0318* (2015.04)

(56) References Cited

U.S. PATENT DOCUMENTS

| | | | |
|---|---|---|---|
| 2011/0045347 | A1 | 2/2011 | Liu et al. |
| 2011/0049437 | A1 | 3/2011 | Crain et al. |
| 2011/0051316 | A1 | 3/2011 | Liu et al. |
| 2011/0177322 | A1* | 7/2011 | Ogrin et al. .................. 428/325 |
| 2011/0203791 | A1 | 8/2011 | Jin et al. |
| 2011/0220348 | A1 | 9/2011 | Jin et al. |
| 2011/0256014 | A1* | 10/2011 | Hong et al. ..................... 419/11 |

FOREIGN PATENT DOCUMENTS

| | | | | |
|---|---|---|---|---|
| CN | 101462219 | A | 6/2009 | |
| CN | 101837972 | A | 9/2010 | |
| CN | 103924150 | * | 7/2014 | .............. C22C 38/00 |
| WO | WO2007/089260 | * | 9/2007 | .............. B32B 15/04 |
| WO | 2009123771 | A2 | 10/2009 | |
| WO | 2010053270 | A2 | 5/2010 | |
| WO | 2011025045 | A1 | 3/2011 | |
| WO | 2011025671 | A1 | 3/2011 | |
| WO | WO2011/103551 | * | 8/2011 | .............. E21B 17/10 |

* cited by examiner

GRAPHENE-BASED STEEL TUBES, PIPES OR RISERS, METHODS FOR THE PRODUCTION THEREOF AND THE USE THEREOF FOR CONVEYING PETROLEUM, GAS AND BIOFUELS

CROSS-REFERENCE TO RELATED APPLICATIONS

This application is a National Stage of International Application No. PCT/BR2011/000415, filed Nov. 4, 2011, which in turn claims the benefit of Brazilian Patent Application PI1102980-3, filed Jun. 7, 2011. The entire disclosures of the above applications are hereby incorporated herein by reference.

TECHNICAL FIELD

The present invention relates to new graphene-based steel tubes, pipes or risers, whose specificities of geometry, chemical composition, microstructure and mechanical properties allow its use for transporting oil, gas and biofuels. This technical solution aimed at improving the structural integrity of such tubes, pipes, or risers produced according to an exclusive method of manufacturing, and that have qualities much higher than those without graphene. The products of this invention have an impact on the transportation of energy, production and use of equipments in the oil field, in deep water subsea riser systems (>1500 m), or terrestrial systems. The present invention has direct applicability in the steel, metallurgical, oil, gas and biofuel industries, and extended to the building systems, medical, biomedical and hospital uses.

BACKGROUND OF THE INVENTION

Graphene is defined as a two-dimensional (2D) nanomaterial consisting of one-atom-thick layer of carbon (C) atoms chemically linked by C—C $sp^2$-bonded. In graphene, the C atoms are densely packed in a planar lattice composed of C6 aromatic rings forming a nanosheet. Graphene exhibits exceptional physical and electronic properties.

However, the diverse potential of graphene have not yet been fully exploited, since the first graphene sheets have been synthesized experimentally in 2004 only obtained through the reduction of graphite.

Carbon-based nanomaterials (e.g. graphite, tubes, graphene or diamond) have at least one dimension at the nanoscale (<100 nm). These materials have attracted great attention due to their unique properties and potential applications in electronics, sensors and energy storage. Note that a planar sheet of graphene is a basis for the origin of carbon nanotubes and graphite. These are, therefore, allotropes of carbon materials, having very different structures and properties.

The International Union of Pure and Applied Chemistry—IUPAC compendium officially defines the state of technology related to graphene: "Previously, descriptions such as graphite layers, carbon layers, or carbon sheets have been used for the term graphene ( . . . ) it is not correct to use for a single layer a term which includes the term graphite, which would imply a three-dimensional structure; the term graphene should be used only when the reactions, structural relations or other properties of individual layers are discussed".

It should be noted, especially, that graphene is at least 100 times stronger than steel.

The intrinsic resistance ($\sigma_{int}$) of graphene is 130 GPa.

The procedures for obtaining graphene still have some limitations due to the low yield of final product. However, it is a relatively simple process in which, in most cases, the graphene nanosheets are generated from the delamination of precursors (e.g. graphite) with layered structures.

Related studies have led to great interest about 2D nanosheets in addition to the graphene nanosheets, such as nanosheets of transition metal chalcogenides, perovskites, and manganese oxide.

The large-scale production of 2D graphene nanosheets remains a major challenge. A variety of techniques for obtaining graphene nanosheets has been reported, such as: by epitaxial growth; chemical vapor deposition—CVD; reduction or chemical exfoliation of graphite in the liquid phase.

Among these above methods, the reduction and exfoliation of graphite allow large-scale reliably and reproducibly to produce graphene. The rapid development of new materials based on graphene has been widely identified in the literature.

In the content displayed on the state of the art, the use of graphene in the manufacture of a steel pipe, duct or riser is unknown.

The American Petroleum Institute—API provides a standardized steel series of Grade 'X' (e.g. X40, X50, X60, X70, X80, X120 and X100) for application in pipes, pipelines and risers systems to transport oil and natural gas.

For example, the term 'X80' defines a standard yield strength (YS) of API 5L steel with a value not less than 80 ksi (about 551 MPa). The high quality API X120 steel presents values of YS of not less than 850 MPa. In this case, the tensile strength (TS) of the steel is in the order of about 900 MPa or higher.

A number of national and international standards help define the compositions and specifications of steel tubes existing in the prior art.

In the United States, the American Society for Testing and Materials—ASTM also sets important standards for the composition, dimensions and characteristics of steel pipes, such as ASTM A-53, ASTM A-36, ASTM A-135, ASTM A-178, ASTM A-214, ASTM A-285, ASTM A-387, ASTM A-440, ASTM A-515, ASTM A-516, ASTM A-517, ASTM A-500, ASTM A-633, and ASTM A-656, whose main definitions are adopted by consensus worldwide.

More specifically regarding the steel composition (carbon and alloy elements), the American Iron and Steel Institute—AISI defines significant standardization on the classification of steels, which are adopted worldwide. For example, a 1XXX grade steel is a simple carbon steel, or negligible amount of other elements, which the sequential numbering indicates the carbon content, such as: AISI 1045, steel with 0.45% of carbon; or AISI 1095, steel with 0.95% of carbon. Thus, the following commercial steel products already produced, whose chemical composition is well known and standardized, can be cited: AISI 1010, AISI 1020, AISI 1040, AISI 1080, and AISI 1095.

In Brazil, the Brazilian Technical Standards Association—ABNT (acronym from portuguese, "Associação Brasileira de Normas Técnicas") defines various rules relating to steel tubes (e.g. carbon steel, electroducts, welded), which stand out: NBR 5580; NBR 5585; NBR 5590; NBR 5595; NBR 5596; NBR 5597; NBR 5599; and NBR 8261.

In Germany, the German Institute for Standardization—DIN (from German abbreviation, "Deutsches Institut für Normung") defines standards with specifications for carbon steel pipes, such as: DIN 1615; DIN 1626; DIN 1628; DIN 2393; DIN 2394; DIN 2440; DIN 2441; and DIN 2458.

In England, the British Standards Institution—BSI reveals the technical standards relating to steel pipes, among which may include: BS 1387; BS 6363; and BS 1139.

However, to date, as shown in the prior art, the main above references for standardization of steel tubes, which stand out from the specifications of API 5L, ASTM, AISI, ABNT, DIN, or BSI, do not mention any feature or to the existence of graphene-based steel tubes, pipes or risers.

It should be noted that some steel products for use in pipelines, including higher levels of resistance, still lack a practical use, although its development is in early stages.

For a better understanding of the present invention, some concepts help to elucidate the state-of-the-art related to tubes, pipes and risers systems.

More specifically, the follow terminologies are used (at the macroscale):

"Tube" or "pipe" is herein defined as reference to a tubular hollow structure, fitted with a longitudinal hole, characterized by the dimensions and an internal diameter (ID) and/or outside diameter (OD) with default values, and that has characteristics of mechanical properties specified for use in many applications, the tube is the basic unit for the construction of pipelines, which are usually attached to one another by circumferential welding.

"Pipeline" is herein defined as an industrial component, a pipe, flexible or rigid, planned for the transport of liquids and gases, or passage of structures; piping systems may include connections such as "T" or "J" types, angular changes in the direction of the tubes, as well as their diameter; pipe represents a set of pipes, valves, pumps, flow controllers and the like.

"Duct" is here called a tube or a pipe, functionalized for the passage of solids, liquids or gases (e.g. gasoduct, i.e. functionalized pipeline to transport natural gas from one place to another); a duct assembles an industrial equipment formed by several successive tubes, resulting in a line of conduct.

"Riser" is defined here as a tube, a pipe or a pipeline configuration, flexible or rigid, used for the transfer of petroleum, oil and oil products, petrochemicals, natural gas, hydrocarbon, biofuels, water and other fluids; the riser also called "uptake tube" is used to transfer and injection of fluids from the wellhead to the Stationary Production Unit.

"Submarine risers" are made of steel pipes, usually rigid, which connect to a floating wells on the seabed, and transport oil, water, gas or mixtures, applied in offshore systems and can reach deep water systems at distances over 1500 meters, already surpassing the deep of 2500 meters; submarine risers are critical components due to high hydrostatic pressure, launch loads, cyclic loading operation and the proper weight that are submitted.

"Land risers" consist primarily of steel pipes that connect a drive for exploration wells in deep underground, on land, and transport oil, water, gas or mixtures, applied to onshore systems.

"Flowline" is called the configuration of the risers when applied to the transport of liquids and injection.

"Natural gas" is a mixture of highly flammable and odorless gas, most common being methane ($CH_4$), and contains other gases such as ethane ($C_2H_5$), propane ($CH_8$) and butane ($C_4H_{10}$) is usually not contaminated with sulfur and so is the cleanest fossil fuel during flaming; after recovery, the propane and butane are removed, and natural gas is converted to liquefied petroleum gas (LPG); LPG is transported in pressurized tanks as a source of special fuel for areas not served by natural gas pipelines.

"API steel" is here defined as a standard metal composition of the iron-carbon (Fe—C) system that includes alloy elements, determined by the American Petroleum Institute (API) for practical use in pipelines to transport oil and gas; the concept of API steel is used as the main reference for the development of the composition of the steel tubes, pipes and risers of this invention.

For the purposes of nomenclature and scope of the present invention, the terms "steel tubes, pipes or risers" include all types of tubular structures (e.g. gasoducts, electroducts), being welded (e.g. obtained by the U-O-E process) or seamless (e.g. obtained by Mannesmann process), varying shapes and sizes, and can be used in any application, since they provide at least the minimum requirements for the use in oil transportation.

"Connection" is a term denoting a piece of steel used for the joining of two structures, in which at least one of the structures is a steel tube.

"Welded connection" is defined here as a heat affected zone (HAZ) of joining a tube to another, including the so-called "composite solder" and the weld metal; a welded steel structure must submit within tolerable limits of defects in solder joints; besides a welded connection being subject to brittle fracture, the base metal can inhibit the propagation of brittle crack.

"Column" is defined here as the structure resulting from welding of tubes, pipes and risers systems until they reach certain length.

"Brittle fracture" is one that occurs at the end of the regime of elastic deformation.

"Ductile fracture" is one that occurs at the end of the regime of plastic deformation.

"Fracture resistance" in steel and steel products is the property of preventing the occurrence of a separation of parts of the material by applying a load; the fracture toughness in steels is directly affected by grain size.

It should be noted that among the many uses of steel risers for transporting oil, its application in ultra deep water is particularly critical, since the risers are exposed to severe environmental conditions in service, such as: the compressive forces, corrosion, extreme variations on the environment temperature (between 50 and −40° C.) and pressure (between 50 and 250 bars).

Several documents published in the state-of-the-art report the development of steel pipes and steel alloys. To date, such products and materials were obtained with different chemical compositions and by various processes, but they differ from the present invention due to the fact that herein it is claimed new steel tubes, pipelines or risers obtained by a unique method of manufacturing involving the addition of graphene sheets, which provides superior properties than those without graphene.

The methods of installation of submarine pipelines have undergone significant changes over the past 20 years. The methods of launching submarine risers systems depend primarily on the type of fabrication of risers and the environment. Depending on the characteristics of the location of installation and method of release chosen, different floating units can be used, such as ships, barges or semi-submersible units. The semi-submersibles have advantage over ships and ferries, for greater stability in rough sea conditions, while ships and ferries are more limited to calm sea conditions.

Concerning its structure, the risers can be flexible or rigid, or even a combination of both types, and constitute a part of the overall cost in the fields of oil exploration. These costs are related to the stages of manufacture, installation and maintenance of such structures.

Rigid risers have a homogeneous wall of rigid material, such as steel or titanium.

Flexible risers have walls formed by combining several layers with different functions, which employ materials such as carbon steel, stainless steel, polymers, and aramid fiber.

In the case of rigid steel risers, the cost of steel itself is mainly related to its size, or more specifically to its thickness (for a given material and defined diameter). The reduction in thickness reduces the cost of steel, so the desired thickness should be the minimum but to provide the necessary resistance to the pipeline. In addition to cost savings, more slender lines are lighter and, in consequence, have greater flexibility in installation.

Both the rigid and flexible risers can be installed featuring a variety of settings. The most common configurations of risers are "free hanging" (catenary free), "steep S", "lazy S", "steep wave," "lazy wave" or "pliant wave." Systems for steel catenary risers—SCR is the most viable of all the settings usually practiced.

The steel catenary risers exceed the use which may not be possible to use flexible risers (e.g. in terms of temperature, pressure or diameter in adverse conditions).

In the Brazilian scenario, for example, the company Petróleo Brasileiro S.A.—PETROBRAS maintained the use of flexible risers as a traditional solution. However, since the recent discovery of a gigantic source of oil in the pre-salt layer of Brazil, specifically in the area of the Santos Basin in ultra deep water (5000-7000 m), there is a technical limitation to the use of flexible risers. This limitation has stimulated the design modification of existing pipelines. According to F. Nepomuceno (2008), the oil found in this area lies at depths that exceed 5000 meters, under an extensive layer of salt.

In the onshore terminals and offshore submarines terminals, rigid steel risers are indicated as most promising technology for transporting oil and gas over long distances and at sub-zero temperatures. Furthermore, increased resistance and/or thicker materials are required in offshore pipelines, due to increased pressure at great depths.

In the scenario of the Pre-salt, so the biggest challenge is to produce steels with high strength, toughness and good weldability so that it can decrease the thickness of the wall duct, and thus obtain an economy of material and a lower oil cost production.

As part of the natural gas exploration, this is done through a refinement to remove impurities and water vapor, and then transported in pressurized pipelines. The U.S. country has over 300,000 miles of pipelines. The distinctive smell associated with natural gas is due to tiny amounts of sulfur compounds (ethyl mercaptan) added during the refining process, to warn consumers about a gas leak.

In the state-of-the-art, it is agreed that the use of natural gas is growing rapidly. Besides being a source of clean fuel, the transportation of natural gas is cheap and easy, as soon as the operating gas pipelines are in operation. In industrialized countries, natural gas is used mainly for heating, cooking, food and vehicles. It is also used in a process to make ammonia fertilizer. The current estimate of natural gas reserves is about 100 million tons. At current levels of use, this source will be available at last about 100 years. Most of the world reserves of natural gas are located in Eastern Europe and the Middle East.

For added safety in the use of tubes, pipes or risers systems, the structural integrity assessment is made using simplified criteria. This assessment incorporates the mechanisms of plastic collapse and mechanical properties (yield stress and yield strength) of the material.

Structural steel used in riser systems, in particular steel for pressure vessels, exhibit substantial increase in fracture toughness, characterized by the integral J on the initial millimeter stable propagation (ductile extension) of a crack. This crack growth is often accompanied by large increase in the plasticity of the material in relation to a stationary crack. The increase in plastic zone in the crack region with the increasing of load of the structure represents, more generally, the dissipation of the work of external forces in the form of energy of plastic deformation.

Therefore, a structure made of ductile material containing a defect continues to support high levels of charge even after the initiation and propagation of stable fracture.

In addition, recent design philosophies address the operation of structures under plastic regime, since the stable propagation of defects contributes to a redistribution of loads and their detection in subsequent inspection operations and maintenance.

Tubular structures with internal pressurization present relative single characteristics in the plastic zone formed ahead of the crack. High pressure tubes, however, have low plastic constraint because they are thin-walled structures, which do not favor the establishment of plane strain state. In addition, there is the formation of a condition of low triaxial loads resulting from the predominance of the membrane tension (due to the internal pressure).

In this context, it is valuable that the final performance of steel pipe and riser systems be a function of the combination of several parameters, as described by Bai-Bai (2005), among which are:

Diameter of the wall pipe (thickness ratio);
Relation between the type of material x service load tension;
Imperfections of the material;
Welding (longitudinal and circumferential);
Corrosion and resulting reduction in the thickness of the wall pipe;
Cracks and crevices (in the pipe and/or welding);
Local stress concentration;
Additional loads and its amplitude.

Several authors have developed analysis patterns to predict the mechanical properties of steel pipes and riser systems. For example, a normalization method of J-R curves of API 5L X80 steel pipe was developed by Zhu-Leis (2008). The experimental determination of toughness and fracture resistance curves (J-R curves) is particularly important in assessing the integrity of the pipeline.

ASTM E1820 provides practical techniques to determine the toughness, resistance to fracture and cracking through the full J-R curve and the crack tip mouth opening displacement—CTOD of a standard sample of steel pipe.

Note, however, that the crack propagation in steel pipe is not only due from the (internal or external) pressure in a deep-sea submarine environment, but also a consequence of fatigue and structural defects of the metallic component.

For this reason, the development of solutions that improve the chemical composition and resistance to fatigue, as well as minimizing the structural defects, it is especially desirable to enhance the integrity of pipelines and risers systems for the oil transportation.

In general, the manufacture of steel is characterized by making a mixture of compounds and coal, generating the initial coke.

Following the above stage, the mixture is heated, which may contain alloying elements defined by weight (wt %), so that sintering occurs with a fine homogenization and smelting of iron ore when the sinter is obtained. It is well known that part of the sintering process consists of a mixture of compounds (partial mixture+coke+return) and heating in a temperature range from 60 to 1200-1350° C., which process is understood by an evaporation of moisture (~100° C.) and drying; dehydration of hydroxides (~150 and 200° C.); combustion and exothermic reactions (between 500 and 700° C.) with the decomposition of carbonates; and a sintering zone (from 900° C.), when several reactions occur in the mixture forming sinter (about 1350° C.), and possible (re)oxidation of oxides.

After sintering, the mixture is subjected to cooling. Throughout this process, the transformation of these compounds in steel occurs through the reduction of carbon by oxygen injection, with minimal contamination by a heat treatment (e.g. using electric arc furnace, or plasma furnace or vacuum). This step is also called refining, when a controlled solidification of the steel is produced, which can be poured into metal molds in the form of ingots (e.g. block format, rectangular or round dowel, pre-shaped, thick or thin plates, or in plates).

The main alloying elements of a steel alloy in Fe—C system are: silicon (Si); aluminum (Al); nitrogen (N); niobium (Nb); manganese (Mn); nickel (Ni); calcium (Ca); titanium (Ti); vanadium (V); molybdenum (Mo); chromium (Cr); copper (Cu); and inevitable impurities.

Reduced levels of alloying elements, i.e. low carbon equivalent ($C_{eq}$), are desirable for a good weldability and low cost of the steel. At the same time, these levels must be sufficiently balanced so as to produce a hardening of the material by formation of precipitates.

Regarding the geometry of a steel tube, the cross-section profile is derived from calculations that take into account the service pressure and stress of the tube, reaching the equivalent of 60% of the yield strength of the material at room temperature. There is a relationship between the values of the external diameter of the pipe and wall thickness. These values are generally pre-set for the thickness and diameter of the pipe, properly tabulated and agreed to certain applications by corresponding standards (e.g. API 5L, BS 1387 and DIN 1615).

Setting a desired geometry, the manufacture of steel tubes involves thermomechanical processing by controlled rolling, which enables a refining of the microstructure (e.g. ferrite-martensite duplex or non-polygonal ferrite morphology). In general, the API 5L from X50 to X120 grades used in steels pipelines have a microstructure with average grain diameter between 2.0 and 30 μm, although there are still many controversies in the literature with regard to grain size. The rolling process aims to obtain a certain thickness of the plate with a simultaneous increase in mechanical strength of steel.

In microalloyed steels, the rolling technique produces considerable effects on the microstructure of the steel, such as the formation of cavity during the fracture process. These cavities run parallel to the rolling direction of the original plate and form perpendicular to the direction of mechanical stress. These cavities are also called delaminations or splits, and occur during the fracture process and ductile splits as a result of perpendicular stresses to the direction of the fracture propagation, which cause plastic constraint at the crack tip, i.e. out-of-plane constraint during the slit. This tension acts perpendicular to the principal stress during the failure process, favoring the cleavage of large grains or decoesion fracture in weak interfaces on the metal matrix.

The morphology of the delaminations can vary depending on the load, temperature and stress state active. As the plastic constraint and therefore the tension acting perpendicular to the principal stress is greatest at the center of the steel specimen, suggests that the stress of delamination in the center of the specimen are more severe.

The occurrence of delamination within the material alters the mechanical response of steel, since it modifies the local stress state at the crack tip. The density of multiple delaminations that occur near the crack tip can significantly increase the fracture toughness and resistance to cracking (J-R curve) of pipeline steels in high-toughness API 5L.

When the conformation of the tube is made by rolling process by "cold work", the deformation is associated with increased inner tension, or stored energy, material and tends to decrease the ductility. The internal stresses may be relieved through various methods of heat treatment or annealing in order to restore ductility. In the manufacture of steel, it is clear that both the chemical composition (alloying elements), as the rolling process, are aspects that influence the final properties of tubes, pipes or steel risers for better quality and service performance.

Note that the rolling process also allows the formation of the seamless tubular structure. An effective technique to control the distribution of surface tension and sub-surface of steel is the process of shot peening (blasting) the surface. In this mechanical surface treatment, a compressive stress is introduced into the metal surface by exposure to a jet shot, at high speed, causing a slight depression that is a surface deformation. Consequently, this process introduces compressive stresses on the surface and subsurface layers in order to delay the nucleation and propagation of fatigue cracks, thus improving the fatigue strength of coated materials. According to Ohji-Niihara (2006), this blast is used to modify the surface layers of materials and improve the strength of metal components.

In the state-of-the-art, it was reported a blasting process on the ceramic surface using tungsten granules. One study was reported about the development of AISI 4340 steel coated with tungsten carbide. Another improvement process of surface treatment was reported by Ko-Yoo (2010) using shots of carbon nanotubes (CNTs) with diameters of about 100 nm, launched at high speed to the material surface to improve their surface properties. Due to the high speed of the granules of small size, the region suffers greater deformation blasted the blasting larger granules.

In another example, the surface of an AISI 1045 steel was blasted with shots under pressure of 0.4 MPa, in a time interval from 10 to 300 s, whose granules are characterized by an average diameter of 80 micrometers, and hardness about 850 HV. The distance between the spray nozzle and the sample was about 100 mm. While the blasting process has been reported in the literature suitable for certain applications, it is necessary to adjust the surface treatment of steel tube with a much smaller granules and promote a high quality finish compatible with the service specification.

Specialized Technical Documentation

The main advances of the prior art related to this invention can be found in the following documents: CN 101,462,219 (2009); WO 2010/053/270 (2008); WO 2011/025/671 (2011); WO 2011/025/045 (2011); US 2011/051/316 (2011); US 2011045347 (2011); CN 101,837,972 (2010); and US 2011/0049437 (2009). The most relevant characteristics reported in the above documents are discussed below.

More specifically, the document CN 101,462,219 (2009), reports a method of repairing cracks using graphene, which can be used to restore a cracked steel, glass, ceramic, quartz, or a carbon material, whose method involves the preparation of a solution (aqueous or organic) based on graphene, the application of said solution into cracks and drying and heating the product at elevated temperatures to restore the broken. However, this method differs from the present invention because it adds graphene in the chemical composition of the steel used in the manufacture of tubes, pipes and risers for transporting oil.

The document WO 2010/053/270 (2010) relates the use of graphene in a resin composition for surface treatment of a steel plate, which comprises a binder resin, and a graphene solvent, however, this method differs from the present invention because that adds graphene in the composition of a resin, while the present invention discloses a new composition of graphene-based steel used in tubes, pipes and risers systems, whose tubular structures are obtained by a different method that includes the rolling and surface treatment by blasting shots of graphene.

The document US 2011/0049437 (2009) reports the development of coatings using the graphene and the addition of at least one ligand activated on a surface, but the present invention is different because here the graphene is used in the chemical composition of the steel tubes, pipes and risers and as shots for the surface blasting them.

In Brazil, a self-supported hybrid riser system and its respective method of installation have been also reported in the document BR 08056331 (2008). A self-supported riser of controlled curvature by the mooring system with multiple interconnections was developed, as contained in document BR 04577 (2008).

The released content to date, as shown in the prior art, demonstrates that there is no technological solution exists, in terms of chemical composition, microstructure, geometry, surface finish or use, resulting in objects of the present invention.

Technical Problem

Briefly, the industrial sector identifies a technical problem in how to improve the structural integrity of pipelines and steel risers systems for oil transportation, with a view to environmental safety, lower costs and higher durability of such structures in offshore and onshore systems.

It should be noted the need to develop appropriate solutions and improvements to increase the mechanical (e.g. tensile strength, resistance to crack propagation or toughness) of steel tubes, pipes, and risers, in order to promote their integrity by addressing the following aspects:
a) minimize risks of oil spills to the environment;
b) increase the lifetime of existing pipeline network to operational reliability;
c) allow the repair and reduce maintenance time during the rehabilitation of pipelines.
However, no solution has been developed to date identified making use of graphene in the manufacture of steel tubes, pipes and risers for the transport of oil.

DESCRIPTION OF THE INVENTION

The present invention was made with Brazilian Government support under Contract MCT/PNPD/CAPES of a Postdoctoral research grant in Materials and Science Engineering, awarded by the State University of Ponta Grossa.

In order to solve the above technical problem mentioned before, and improve the structural integrity of existing risers systems, the invention "GRAPHENE-BASED STEEL TUBES, PIPES OR RISERS, METHOD OF MANUFACTURING THE SAME, AND THEIR UTILIZATION FOR PETROLEUM, GAS AND BIOFUELS TRANSPORTATION" was developed, whose products are characterized by a unique chemical composition based on graphene nanosheets with surface area between 60 and 2630 m$^2$/g, where the carbon atoms are densely packed in a 2D lattice with carbon (C) bonds type sp$^2$, with atomic content ranging between 0.01 and 21.0% C (weight percent, i.e. wt %), endowed with a unique geometric configuration, both wall thickness (from ultra thin to ultra thick) as the diameter, tensile strength not less than 2000 MPa, reaching up to 50 GPa, endowed with a sandblasted surface and multifunctional coating layer, said tubular structures with so far superior features to those obtained by other methods.

In this invention, the unique method of manufacturing the graphene-based steel tubes, pipes or risers comprises the following main steps of:
a) preparing the powder mixture with the addition of graphene nanosheets, iron ores and alloying elements, for preparation of the chemical composition of steel based on graphene; or adding graphene on the steel in liquid state;
b) making the heat treatment of sintering of the above graphene-based mixture in temperature ranging between 1000 and 3773 K, more preferably between 1573 and 1773 K, when the graphene-based steel is obtained, or leaked in the form of ingots;
c) forming the tubular geometry, with exclusive patterns of wall thickness and diameter;
d) making the surface finish of the tubes, pipes or risers obtained by shot peening process (blasting) with graphene shots, and obtaining a multifunctional coating layer.

In the case of forming of tubular pieces by centrifugal casting process, the step (c) precedes the (b) sintering step.

The present method of manufacturing accepts that different parameters are adjusted throughout the steel and metallurgical processes, with reference to the current technical standards and related uses of such structures. Such parameters can be modified, since they provide the achievement of graphene-based steel tubes, pipes or risers with the particular characteristics relating to: (i) chemical composition and microstructure, (ii) tubular geometry, (iii) mechanical properties, and (iv) surface finish of the products obtained in this invention.

BRIEF DESCRIPTION OF THE DRAWINGS

The invention is clarified and further described in detail in the following by way of various embodiments and the figures, in which.

DETAILED DESCRIPTION OF THE INVENTION

A detailed description of the invention is comprised by the inventive subjects of: a method of manufacturing of graphene-based steel pipes, tubes or risers, the exclusive products obtained by that said method, and the preferred use of such products obtained, having welded joints or being seamless. The topics (1), (2) and (3), successively described throughout this document, indicate in detail the above invention information.

1) Method of Manufacturing Tubes, Pipes or Risers

Figure 1:
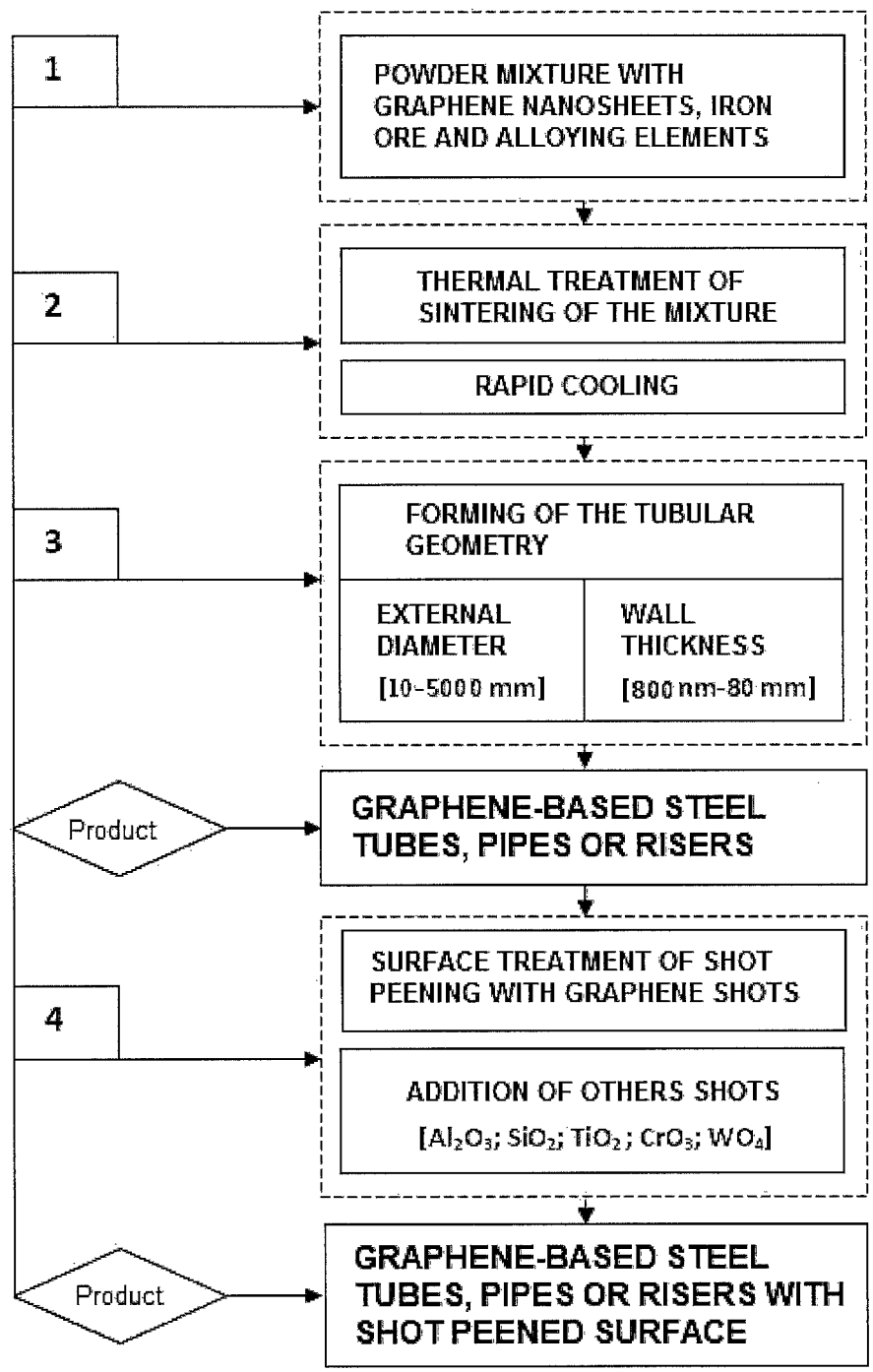
FIG. 1: illustrates the steps of the method of manufacture of pipes, ducts, steel risers based on graphene, including: (1) preparation of steel a mixture of graphene nanosheets, iron ores and alloys, (2) heat treatment the mixture based on graphene, (3) conformation of tubular geometry, tubular products are obtained at the end of the steps (1), (2) and (3), regardless of the order of the same, (4) surface finish by blasting granules of graphene, accepting addition of other particulate granules (e.g. $Al_2O_3$, $SiO_2$, $TiO_2$, $CrO_3$, $Cr_2O_3$, WC, $WO_3$, $WO_4$, or diamond), and obtain a covering layer of graphene-based combined with: ZrN, CrN, TiN, TiAlN, TiC, TiCN, TiBN, VC, $Li_3BO_3$, $TiB_2$, $TiO_2$, $AgNO_3$, Ag, $MgBr_2$, $CaF_2$, $SiO_2$, $CrO_3$, $Cr_2O_3$, WC, $WO_3$, $WO_4$, $Al_2O_3$, aluminates doped with lanthanide ions (Ln) such as $MAl_2O_4$:Ln, $M_3Al_2O_6$:Ln, $M_4Al_{14}O_{25}$:Ln (M consisting of Be, Mg, Sr, Ba or Ca), diamond, gold, or a combination of such compounds.

The different steps that comprise the method of manufacturing of graphene-based steel tubes, pipes or risers, briefly described in FIG. 1, are particularized in the following items.

a) Mixing Powders of the Chemical Composition of the Graphene-Based Steel

In FIG. 1, the first step (1) of the method of manufacturing consists to make the addition of graphene nanosheets in the chemical composition of steel by mixing the following compounds:

i) Graphene nanosheets: adjust the carbon content from 0.01 to 21.0% (C, wt %) with C—C interatomic bonds with 0.142 nm of distance, in C6 hexagonal ring structure, surface area from 60 to 2630 $m^2/g$, average particle size (side) between 3.0 and 100 μm, structured in a planar atomic layer, or n-layers (for $1 \leq n \leq 10$), formed by bonds of $sp^2$ type, regular or in "ZIG-ZAG", whose carbon atoms are densely packed in a 2D lattice; allotropes of carbon may be added as a complement to the carbon content of the steel;

ii) Iron minerals: hematite, magnetite, limonite, siderite, pyrite, ilmenite and/or olivine, added to balance the chemical composition with Fe;

iii) Alloy elements: ligand atoms can be added, such as Al, Co, Cu, Cr, Mn, Mo, Ni, Si, W and V.

More specifically in the above step (i), the present invention includes the functionalization of graphene nanosheets before their addition on the chemical composition of steel, with the aim of improving its bonding to alloying elements. FIG. 2(b) indicates the presence of nanofunctionalized graphene with peripheral bonding originated on the surface of the nanosheets.

This functionalization of graphene can be effected by chemical ionic and covalent bonding, or van der Waals interactions by different functional groups, such as: —COOH, —NO, —$NH_2$, —CN, —CCH, —$CH_3$, —$CaC_6$; —$YbC_6$; —$C_{60}H_2$ (hydrogenated fullerene); —OH; —H; —F; —HCl; —HF; —$F_2$; —$NHNH_2$; or by a combination of such functional groups.

During the addition of nanofunctionalized graphene, a heat treatment should be performed at low temperature rates between 120 and 400° C.

Specifically in the above step (iii), the alloying elements present in the chemical composition of the graphene-based steel tubes, pipes or risers are added in the following amounts (wt %):

Aluminum (Al): from 0.01 to 0.3%, acts as a deoxidizing and control of grain growth;

Cobalt (Co): from 0.01 to 2.0%, used to improve the hardness at high temperatures;

Copper (Cu): from 0.01 to 2.0%, serves to improve corrosion resistance in submarines;

Chromium (Cr): from 0.1 to 18.0%, serves to improve corrosion and high temperature resistances, tensile strength, wear and hardness;

Manganese (Mn): from 0.1 to 3.0%, used to improve the tensile strength (100 MPa increase of 1% Mn) and hardness;

Molybdenum (Mo): from 0.1 to 0.6%, improves corrosion and high temperature resistances, wear and hardness;

Nickel (Ni): from 0.1 to 3.0%, used to improve the tensile strength (increase of 40 MPa for 1% Ni), corrosion resistance and the limit of elasticity;

Silicon (Si): from 0.01 to 0.8%, acts as a deoxidizing, and improves corrosion resistance and traction, and makes welding;

Tungsten (W): from 0.1 to 3.0%, used to improve the tensile strength and hardness at high temperatures;

Vanadium (V): from 0.01 to 0.1%, refines the structure of the steel and prevent the growth of grains.

The following elements may be also added at low levels:
Nitrogen (N): up to 0.8%;
Niobium (Nb): up to 0.25%;
Calcium (Ca): up to 0.006%;
Titanium (Ti): up to 0.03%;
accepting the presence of inevitable impurities (e.g. P, Pb and S).

Adding graphene exerts significant influence on the mechanical properties of graphene-based steel tubes, pipes or risers. Both the size (lateral) of the nanosheets and such as the added carbon from graphene affects its ductility.

Thus, for a more specific use of the said tubes, pipes or risers for transporting petroleum in deep waters, it is acceptable that the chemical composition of the graphene-based mixture presents levels of carbon and other alloying elements according to the following specifications:

API 5L steels: chosen from grades X50, X52, X60, X65, X70, X80, X90, X100 and X120, 2H or API, or API 2Y;

AISI steels: chosen from grades 1010, 1020, 1040, 1080, 1095, A36, A516, A440, A633, A656, 4063, 4340, 6150;

ASTM steels: chosen between grades A285, A387, A515, A516, A517;

BSI 4360 steels;

DIN EN 10208-2 steels;

or from any other steel specification.

These graphene-based steel tubes, pipes or risers are characterized by containing a maximum carbon equivalent ($C_{eq}$) amounting to 4.00%, which satisfies the following $$C_{eq}=C+(Mn/6)+\{(Cr+Mo+V)/5\}+\{(Cu+Ni)/15\} \quad \text{Eq. (1).}$$

Reduced levels of alloying elements, i.e. low levels of $C_{eq}$, are desirable for the steel to good weldability and low cost, and should be sufficiently balanced so as to produce a hardening.

Thus, the graphene-based steel mixtures comprise preferably the following amounts (wt %): 0.01 to 0.03% C, 0.17% Si; 0.021% Al; 0.63% N, 0.052% Nb; 0.56% Mn; 0.20% Ni; 0.013% Ti; 0.03% V; 0.13% Mo; 0.12% Cr; 0.002% Cu; and Fe balanced.

b) Heat Treatment of Graphene-Based Mixture

In FIG. 1, the second stage (2) of the method of manufacturing comprises the thermal treatment of the graphene-based mixture obtained in step (1). This second step may be preferably made by powder metallurgy, accepting any other metallurgical processes such as casting and continuous casting. The heat treatment may be performed under temperature range between 1000 and 3773 K (e.g. by using electric arc furnace, or plasma furnace, and/or vacuum). The thermal cycle (e.g. time, heating rate, firing threshold) should be enough to produce the sintering of the mixture and at least the formation of austenite phase (AR3). Below, it is effected a rapid cooling of the sintered mixture.

More specifically, it is effected a heating of the mixture from 323 K, preferably until it reaches a temperature range between 1573 and 1773 K, so the occurrence of the melting and sintering with homogenization of the fine iron ore are concluded.

This heat treatment process has some typical characteristics of conventional sintering of steels (e.g. evaporation of moisture, dehydration of hydroxides and carbonates decomposition). However, the powder metallurgy here is distinguished by generating leads peripheral carbon atoms from the functionalized graphene during the sintering process under high temperatures, bonding the graphene nanosheets to unsaturated ions of alloying steel and iron atoms.

c) Conformation of the Tubular Geometry

Figure 2:
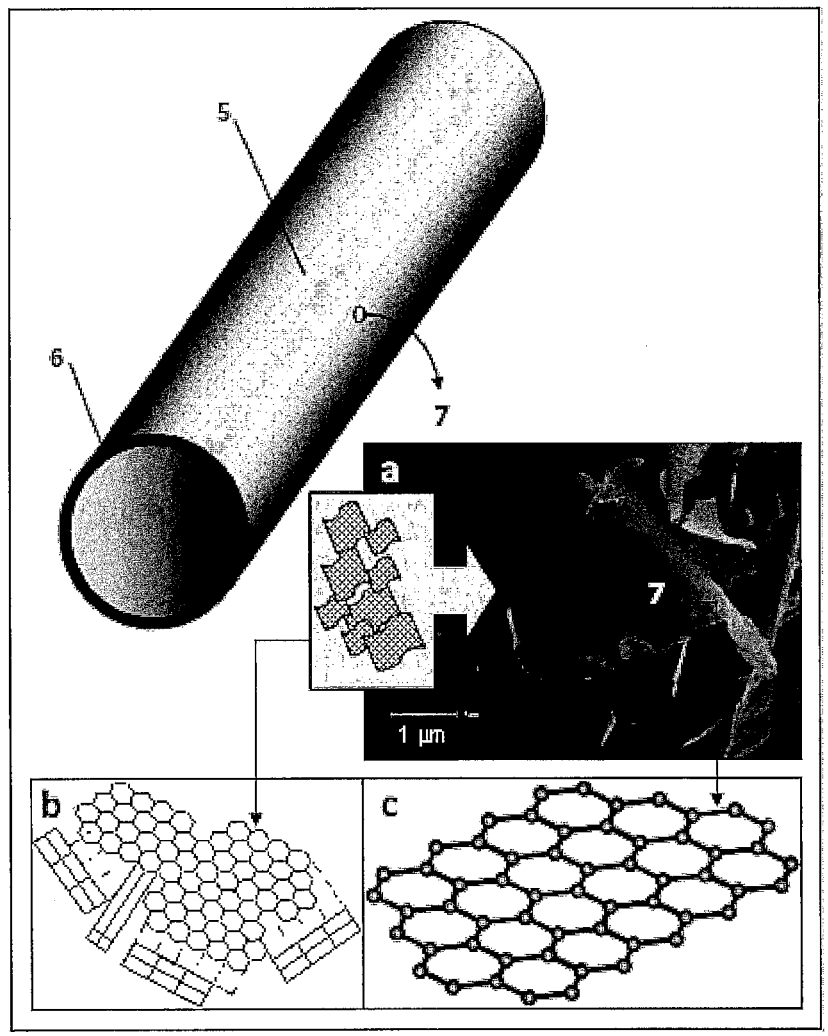
FIG. 2: overview of a graphene-based steel pipe, tube or riser, showing the (5) the outer surface of the tube, whose wall thickness (6) can vary between 800 nm and 80 mm, containing graphene nanosheets in its chemical composition, as image obtained by scanning electron microscopy (7), with surface area of about 60 and 2630 m$^2$/g, as shown in detail (7a), said nanosheets that can be functionalized and have peripheral bonds (7b), and structurally arranged in hexagonal rings C—C (7c).

According to FIG. 1, the third stage (3) of the method of manufacturing is to make the conformation of the geometry of the graphene-based steel tubes, pipes or risers. As shown in FIG. 2, this geometry can be set considering the shape profile and wall thickness (6), as well as (5) the outer surface of the tube. The dimension of the geometry must be determined according to the working pressure and operating pressure.

The process of formation of such geometry is characterized by obtaining graphene-based steel tubes, pipes or risers with values of wall thickness (6) between 800 nm (ultra thin wall) and 80 mm (thick wall).

Figure 3:
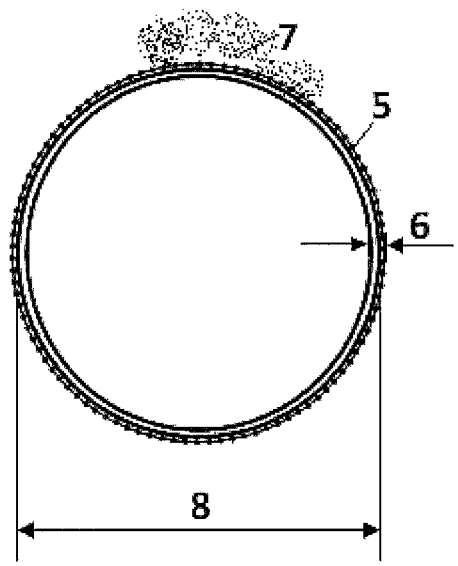
FIG. 3: cross section of a graphene-based steel pipe, tube or riser, which shows its outer surface (5), whose wall thickness (6) accepts values between 800 nm and 80 mm and can be subjected to a surface blasting by graphene (7) shots, said tube has an outer diameter (OD) between 10 and 5000 mm.

These extreme values of geometry are only possible due to good solubility of carbon atoms from (7) graphene nanosheets in the mix of steel (FIG. 2). The exceptional mechanical strength produced by the graphene gives a tube with ultra-thin wall thickness (6), for example, similar to a "can of soda", in relation to its outside diameter (8) (FIG. 3).

The formation of tubular geometry can be made through the following processes, for example: rolling; or extrusion; or forging; or wire drawing; or deep drawing; or stretching; or bending; or shear; or tightness; or casting; or molding injection; or spin; or machining; or by a combination of these processes.

More specifically, the controlled rolling is desirable because it allows both the conformation of the tubular geometry from a plate with a certain thickness, and obtaining the refinement of the microstructure. Another benefit is the obtaining of seamless steel tubes, pipes or risers.

The method of manufacture of graphene-based steel tubes, pipes or risers has a direct influence on the final properties of the same, quality and service performance, both the stage of powder mixture of steel (graphene, iron ore and elements league and/or fusion thereof), as forming the tubular geometry.

For example, graphene-based steel tubes, pipes or risers might be subjected to a cyclic loading and corrosive environment. In this invention, the undesirable fatigue and corrosion effects derived from these environments can be prevented by the blast surface treatment with granules (shots) of graphene, which serves to introduce compressive stresses in the surface layers and sub-surface thereof, as described below.

d) Surface Finish by Shot Peening (Blasting) with Graphene Shots

The last step (4) of this method of manufacture (FIG. 1) consists of a mechanical process of shot peening by blasting the surface with graphene shots. This blast is exemplified in FIG. 3, in which a flow of graphene shots under controlled conditions, i.e. pressure, distance to collision, and average size of graphene, introduces plastic deformation on the outer surface (5) of the wall of tubes, pipes or risers, whose roughening of the external thickness (6) can be modified, after exposure to jet graphene granules (7). The blasting of the metal surface serves to introduce compressive residual stresses in the surface layers and/or sub-surface in these tubular structures, and delaying the nucleation and crack propagation, thus increasing resistance to fatigue and corrosion.

One advantage of the graphene-based steel tubes, pipes or risers subjected to shot peening process consists in improving the fatigue resistance of these products, with an increase in mechanical strength and life in fatigue, and therefore, its structural integrity.

The surface treatment by graphene blasting accepts the addition of other particulate granules (shots).

In the case of using the combination with other shots, in addition to graphene, it is possible to produce different surface modifications of these metal components. Thus, the following shots can be used:
i) aluminum shot (e.g. $Al_2O_3$ or alumina);
ii) silicon shot (e.g. $SiO_2$ or silica);
iii) titanium shot (e.g. $TiO_2$ or titania);
iv) chromium shot (e.g. $CrO_3$ and $Cr_2O_3$);
v) tungsten shot (e.g. WC, $WO_3$, or $WO_4$);
vi) diamond shot.

In the present invention (FIG. 1), the fourth step (4) of blasting with graphene shots is characterized by being made with the following shot peening process parameters:

Speed (depends on the thickness of the wall pipe) is dependent on the pressure used;
Pressure: 0.3 to 1.0 MPa;
Time range: 10 to 300 s;
Average size of shots (side): between 3 and 30 μm;
The surface area of shots: 60 to 2630 $m^2/g$;
Distance (collision) between the spray nozzle and steel: from 70 to 100 mm.

Besides the shot peening process reported in the literature has been suitable for certain applications, it is necessary to adjust the surface treatment of steel tube with a much smaller shots that promote a high quality finish compatible with the service specification.

The surface modifications resulted from the shot peening treatment involve the formation of surface roughness, hardening of the tube wall near the surface of steel, and a distribution of compressive residual stresses. The parameters of the surface blasting process must be sufficiently adjusted (speed, pressure, blasting time, size and hardness of the granules/shots, and the distance between the spray nozzle and pipe), in order not to damage the surface of the graphene-based steel tubes, pipes or risers. For example, an intensity too intense or excessive blasting can induce excessive formation of craters, ridges and cracks on the surface and accelerate the nucleation and early propagation of cracks.

The advantages of shot peening in the graphene-based steel pipes, tubes or risers consist on the improvement of their final characteristics, such as:
i) increasing resistance to plastic deformation and residual stress profile, reducing the driving force for crack propagation;
ii) cleaning the surface thereof, in the previous step to the coating;
iii) increasing the surface roughness for better adhesion of the coating layer, if any.

In particular, the increased resistance to fatigue associated to shot peening with graphene shots is related to the ability of residual stresses to resist crack propagation.

In this method of manufacturing, the surface finish of the graphene-based steel tubes, pipes or risers includes obtaining a surface coating layer of the wall (interior or exterior) prior blasted. This finish is the formation of a layer of coating thickness between 30 nm and 5.0 mm, preferably between 100 nm and 50 µm, with multifunctional properties, by combining different properties, such as:
i) a thermal insulating coating layer;
ii) a corrosion resistant/chemical attack resistant coating layer;
iii) an antibacterial coating layer;
iv) a luminescent coating layer.

The said coating layers can be produced on the basis of the following compounds, always combined with graphene: ZrN; or CrN; or TiN; or TiAlN; or TiC; or TiCN; or TiBN; or VC; or $Li_3BO_3$; or $TiB_2$; or $TiO_2$; or $AgNO_3$; or Ag; or $MgBr_2$; or $CaF_2$; or $SiO_2$; or $CrO_3$; or $Cr_2O_3$; or WC; or $WO_3$; or $WO_4$; or $Al_2O_3$; or aluminates doped with lanthanide ions (Ln), such as $MAl_2O_4$:Ln, $M_3Al2O_6$:Ln, $M_4Al_{14}O_{25}$:Ln (M consisting of Be, Mg, Sr, Ba or Ca); or diamond; or gold; or a combination of such compounds.

The techniques that can be used for obtaining the coating layer of said graphene-based steel tubular structures are:
i) a coating layer by CVD—chemical vapor deposition, ex. plasma assisted CVD;
ii) a coating layer by PVD—physical vapor deposition, ex. PVD magnetron sputtering;
iii) a coating layer by shot peening (blasting) using air pistol, ex. thermal spraying, namely by plasma or laser.

More specifically, the coating deposition technique by physical vapor phase can be accomplished with the following parameters:
Distance between the tubular surface and target: 40 and 120 mm, preferably 50 mm;
Bias voltage alternating tubular surface: from −200 to +200 V, preferably from −180 V;
Time range: 0.5 to 4 hours, preferably for 1 h;
Intensity of current: 0.7 to 2.0 A, preferably 1.0 A;
Atmospheric deposition: Argon (inert), $N_2$—$H_2$ (reduction) or air (oxidant).

In the case of the coating of tubes, pipes or risers to be made by blasting using air pistol, the use of graphene and/or above compounds mixed with an epoxy resin is also recommended. The blasting using pistol permits a covering layer with greater thickness that can vary from 50 nm to 5.0 mm, preferably in the order of 500 µm.

2) Graphene-Based Steel Tubes, Pipes or Risers
a) Chemical Composition and Microstructure In this invention, the graphene-based steel tubes, pipes or risers are characterized to comprise an exclusive chemical composition including graphene, alloy elements and their respective contents (wt %):
Carbon (C): from 0.01 to 21.0%, from graphene;
Aluminum (Al): from 0.01 to 0.3%;
Cobalt (Co): from 0.01 to 2.0%;
Copper (Cu): from 0.01 to 2.0%;
Chromium (Cr): from 0.1 to 18.0%;
Manganese (Mn): from 0.1 to 3.0%;
Molybdenum (Mo): from 0.1 to 0.6%;
Nickel (Ni): from 0.1 to 3.0%;
Silicon (Si): from 0.01 to 0.8%;
Tungsten (W): from 0.1 to 3.0%;
Vanadium (V): from 0.01 to 0.1%.

The following elements might be added at low contents:
Nitrogen (N): up to 0.8%;
Nyobium (Nb): up to 0.25%;
Calcium (Ca): up to 0.006%;
Titanium (Ti): up to 0.03%;
and accepting the presence of inevitable impurities (ex. P, Pb e S).

The said graphene-based steel tubular products are characterized by containing a grain microstructure composed of the following crystalline phases:
i) ferrite (α-iron body-centred cubic, bcc, or γ-iron face-centred cubic, fcc);
ii) austenite (γ-iron, face-centred cubic, fcc);
iii) cementite or iron carbide ($Fe_3C$);
iv) perlite (ferrite+cementite);
v) martensite and/or bainite;
vi) or a combination thereof.

The resulting microstructure shows average grain size ranging from 500 nm to 50 µm, which grains may have regular or irregular edge, in which elements are iron atoms attached to the graphene nanosheets. In addition, the graphene-based steel tubes, pipes and risers are characterized by presenting a microstructure with carbon allotropic structures, which can be:
i) carbon nanotubes (single wall or multiple);
ii) carbon fibers (nanowires or nanorods);
iii) nanodiamond;
iv) fullerenes;
v) graphite;
vi) or a combination thereof;
said structures that may be bounded to $Fe_3C$ available in concentrations up to 0.01% (C, wt %). For example, presence of $Fe_3C$ compounds confined inside carbon nanotubes.

The tubular structures of the present invention have the advantage of having greater structural integrity due to better distribution of internal stresses in the pipe along the interfaces of the graphene.

b) Tubular Geometry

More specifically, the graphene-based steel tubes, pipes and risers are characterized by presenting the following limit values:
Outer tube diameter: from 50 mm (e.g. narrow tubes for conventional use), ranging up to 5000 mm (extended-gauge tubes for the transportation of oil);
Wall tube thickness: from 800 nm (ultra thin-walled tubes, for example, for the passage of optical fibers), ranging up to 80 mm (thick-walled tubes, high strength, for example, to transport oil).

In TAB. 1, $\sigma_T$ represents the minimum tensile strength and $\sigma_M$ is the maximum tensile strength of new graphene-based steel pipes, tubes or risers obtained by that method.

The limited specifications of geometry for such structures, i.e. wall thickness (6) and outer diameter (8) are set based on the circular profile (FIG. 3), or circumscribed for other geometries. These values exceed the agreed standards in the main current technical standards (e.g. API 5L, BS 1387, ISO 3183 and DIN 1615), pre-set for conventional steels without graphene.

In this invention, the obtaining of that geometry, subject to meeting the criteria already established in existing standards, has the advantage of making tubes, pipes or risers stronger or much thinner and lighter with ultrathin wall in the order of 800 nm, with simultaneous increase in strength, than those who do not have graphene nanosheets.

c) Physical and Mechanical Properties

The high mechanical strength of at least 2000 MPa, reaching up 50 GPa, and its appreciable corrosion resistance, make the new graphene-based steel tubes, pipes or risers manufactured by this method a competitive advantage for the metallurgical industry. The unique method allows for such structures with different values of geometry, thinner, or necessarily more robust than those products usually practiced in the prior art.

These graphene-based steel tubes, pipes or risers are characterized by presenting a coating surface that assigns different properties, to be provided with, for example, of:

i) a layer with corrosion resistance, chemical attack and/or thermal insulation resistances, in particular a graphene-based layer composed by a combination with ZrN, or CrN, or VC, or

TABLE 1

| Utilization | Geometry | | References | Examples of classifications and specifications |
|---|---|---|---|---|
| | Outer diameter, mm (circular or circumscribed profile) | Wall thickness (ultra thin to ultra thick) | | |
| Petroleum, gas and biofuels transportation $\sigma_T$ > 2000 MPa $\sigma_M$ ~50 GPa | 100-5000 | 800 nm to 80 mm | API 5L e ISO 3183 | A, B, X42-X120 |
| | 500-1500 | 800 nm to 25 mm | DIN EN 10208-2 Steel piping for flammable substances | L245MB, L290MB, L450MB, L485MB, L550MB |
| | 500-1000 | 800 nm to 20 mm | Standard 20295-85 Welded steel pipes for gas and oil pipelines | K34, K42, 50, K52, K55, K60 |
| | 500-2000 | 800 nm to 30 mm | Standard 52079-2003 Welded steel pipes for the gas and oil pipelines | K34, K38, K42, K48, K50, K52, K54, K56, K60 |
| | 500-1500 | 800 nm to 20 mm | TU 1104-138100-357-02-96 Spiral steel pipes OD 720, 820, 1020 and 1220 mm corrosion-resistant, with outer shell of pressure up to 7.4 MPa | 17G1S, 17G1S U-K52, K55, K60 |
| | 300-1500 | 800 nm to 20 mm | TU 14-3-1976-99 Spiral steel pipes corrosion-resistant, with outer shell of pressure up to 7.4 MPa | 17G1S, 17G1S 13G1S-Y-Y, 10G2FB, K56, K60 |
| Conventional use | 10-3000 | 800 nm to 40 mm | Standard 8696-74 Spiral welded steel tubes for general use | Standard 2SP, 3SP, 20 low-alloy |
| Nuclear power plants | 500-5000 | 800 nm to 80 mm | TU 13.03-011-00212179-2003 Spiral carbon steel pipe 20 to power pipelines of nuclear power plants | 20 |
| Thermal networks | 500-1700 | 800 nm to 25 mm | TU 14-3-954-2001 Spiral steel pipes of 530-1420 mm diameter for thermal pipeline network | Standard 3SP5, 20, 17G1S, 17G1S U-17GS |
| | 500-1500 | 800 nm to 20 mm | TU 14-3R-69-2003 Spiral steel tubes with increased corrosion resistance for heat networks | Standard 3SP5, 20, 7G1S, 17G1S-Y (K42, K50, K52, K60) |
| | 1000-2000 | 800 nm to 30 mm | TU 14-156-76-2007 Spiral steel pipes 1420 mm of pressure to 9.8 MPa | K60, X70 |

The cross section (profile) of the tubular structure may have different geometries, whose measurements are specified from the outer wall (e.g. square tube 20×20 mm), such as:
 elliptical;
 triangular;
 square;
 rectangular;
 pentagonal;
 hexagonal;
 or other polyhedral geometry.

$Li_3BO_3$ or $MgBr_2$, or $CaF_2$, or $SiO_2$, or $CrO_3$, or $Cr_2O_3$, or WC, or $WO_3$, or $WO_4$, or $Al_2O_3$, or diamond;

ii) and/or a luminescent layer, in particular graphene-based layer composed by a combination with aluminates doped with lanthanide ions (Ln), such as $MAl_2O_4$:Ln, $M_3Al_2O_6$:Ln, $M_4Al_{14}O_{25}$:Ln (M consisting of Be, Mg, Sr, Ba or Ca);

iii) and/or an antibacterial layer, in particular graphene-based layer composed by a combination with TiN or TiAlN, or TiC, or TiCN, or TiBNi, or $TiB_2$, or $TiO_2$, or $AgNO_3$, or Ag, or gold, or a combination of such compounds.

Apart from considering that graphene nanosheets exhibit the property of luminescence, such graphene-based steel tubes, pipes or risers are characterized by presenting the physical property of luminescence on the surface thereof. This property is derived from the exceptional coating layer surface, in particular that consists of graphene and oxides doped with lanthanide ions (e.g. $SrAl_2O_4$:Ce, Dy), which produces luminescence emission in UV-VIS region of the electromagnetic spectrum above the threshold of visibility the human eye.

Such tubular structures, luminescent, have the ability to absorb the light energy and emit light in the dark, in short or long afterglow, and may be useful as "geo-markers" in deep subsea systems (FIG. 5), during periodic inspections, used interchangeably.

More preferably, the exclusive multifunctional luminescent coating layer gives the advantage of graphene-based steel tubes, pipes or risers be used with greater safety in the transport of gas, oil or biofuels, for example, in dark, in underground systems.

These tubes, pipes or risers also accept the application of indicative adhesives of hazardous or flammable gases on the covering layer, which gives them a complete self-luminescent signaling functionality, either in marine, air or land environments.

3) Utilization of the Graphene-Based Steel Tubes, Pipes or Risers a) Utilization for Mechanical Tests for Assessing Structural Integrity One use of graphene-based steel tubes, pipes or risers obtained by such manufacturing method is characterized by comprising specimens (SP) to perform mechanical tests to evaluate structural integrity (e.g. fatigue testing, tensile, cyclic deformation), being standardized (e.g. according to ASTM E 1820), or non-standard (e.g. SE(T)).

For this use, they should be sectioned to form SP, preferably of three types: [SE(B)], [C(T)] or [DC(T)].

The dimensions of each of the SP vary according to the fracture toughness test, using parameters such as $K_{IC}$ factor of material intensity [$MPa \cdot m^{1/2}$], the $J_{IC}$ integral of fracture resistance [$kJ/m^2$], and the crack tip opening displacement, CTOD [mm].

Figure 4:
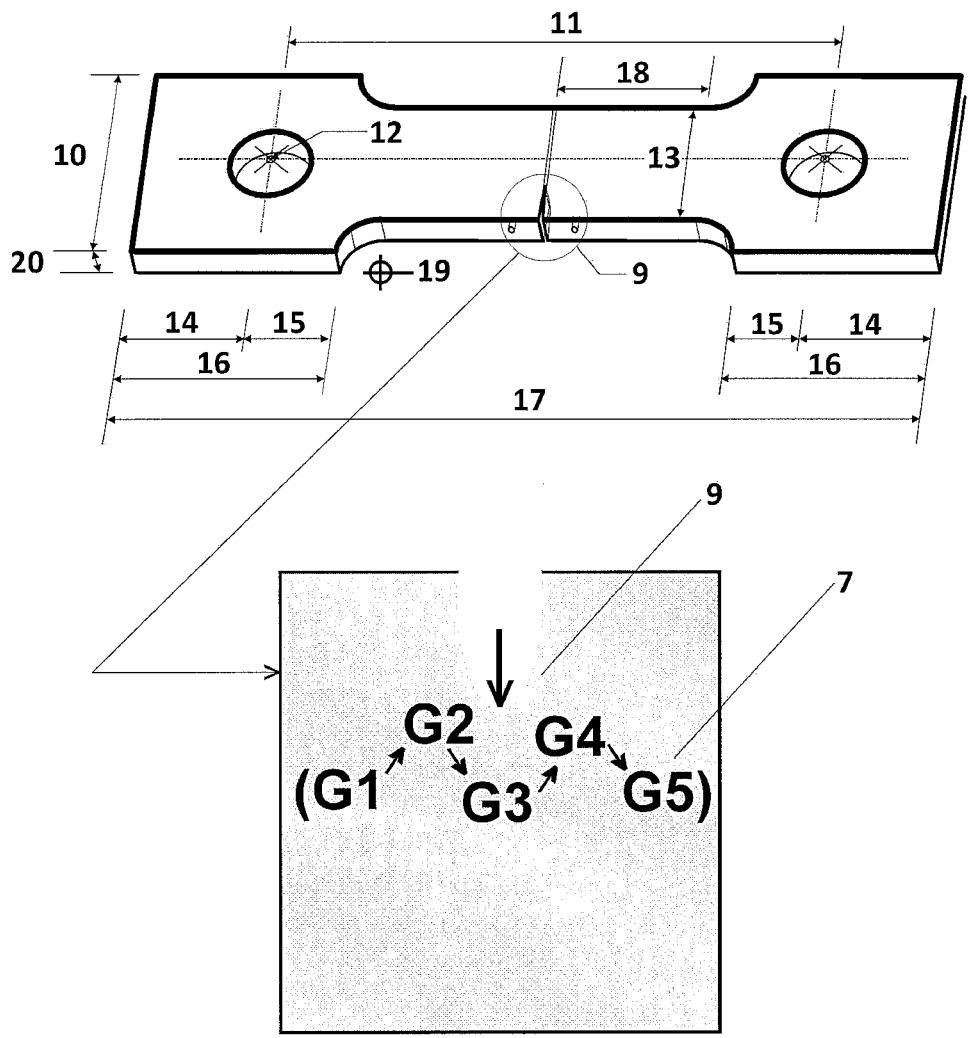
FIG. 4: section of the wall of a graphene-based steel pipe, tube or riser, used as a specimen (SP) for mechanical tests and structural integrity analysis, comprised of: (9) a pre-crack (a); (10) specimen width of 55 mm (11); distance from the axis (H) of 114 mm; showing a (12) radius of curvature of specimen of 10 mm; (13) wall width (W) double of thickness; with (14) distance from the edge of the specimen to the center hole of 31 mm; presenting (15) a straight section up to the center hole of 19 mm; (16) base length of 50 mm; said (17) total length of SP being of 176 mm; which presents (18) a straight section from the center of the crack of 28 mm; (19) and a radius of curvature from the base of 10 mm; and being this type of SP characterized by having a thickness (20) between 2.0 and 25.4 mm.

As shown in FIG. 4, this utilization is characterized by these graphene-based steel tubes, pipes or risers comprise SP, for example, with the following features:

A pre-crack (9);
SP width of grip section (10), for example, of 55 mm;
Distance between axes (11), i.e. "H", for example, of 114 mm;
Radius of curvature of SP (12), for example, of 10 mm;
Width (13), i.e. "W", double of thickness;
Distance from the edge of the SP to the center of the hole (14), for example, of 31 mm;
Straight section up to the center of the hole (15), for example, equal to 19 mm;
Length of grip section (16), for example, of 50 mm;
Overall length of SP (17), for example, of 176 mm;
Half of gage length (18), for example, of 28 mm;
Radius of curvature with grip section (19), for example, of 10 mm;
Thickness of the SP (20), for example, between 2.0 and 16 mm.

More specifically, FIG. 4 illustrates an use of a graphene-based steel tube for mechanical testing for evaluation of structural integrity, for example, of fracture toughness, characterized by comprising a section of the wall pipe, whose specimen (SP) samples, non-standardized, present the following characteristics: a pre-crack (9); SP width of grip section (10) of 55 mm; distance between axis of holes (11) for loading pins (H) that can vary from 128 to 224 mm; featuring a radius of curvature (12) of the SP of 10 mm; (13) width (W) double of thickness; (14) distance from the SP edge to the center of the holes of 31 mm; (15) presenting a straight section up to the center of the hole equal to 19 mm; (16) length of grip section of 50 mm; said (17) overall length of the SP equal to 176 mm; which presents a half gage length (18) of 28 mm; and a (19) radius of curvature with grip section of 10 mm; and that may have a specimen thickness (20) between 2.0 and 15 mm.

b) Utilization for Petroleum, Gas and Biofuels Transportation

Figure 5:
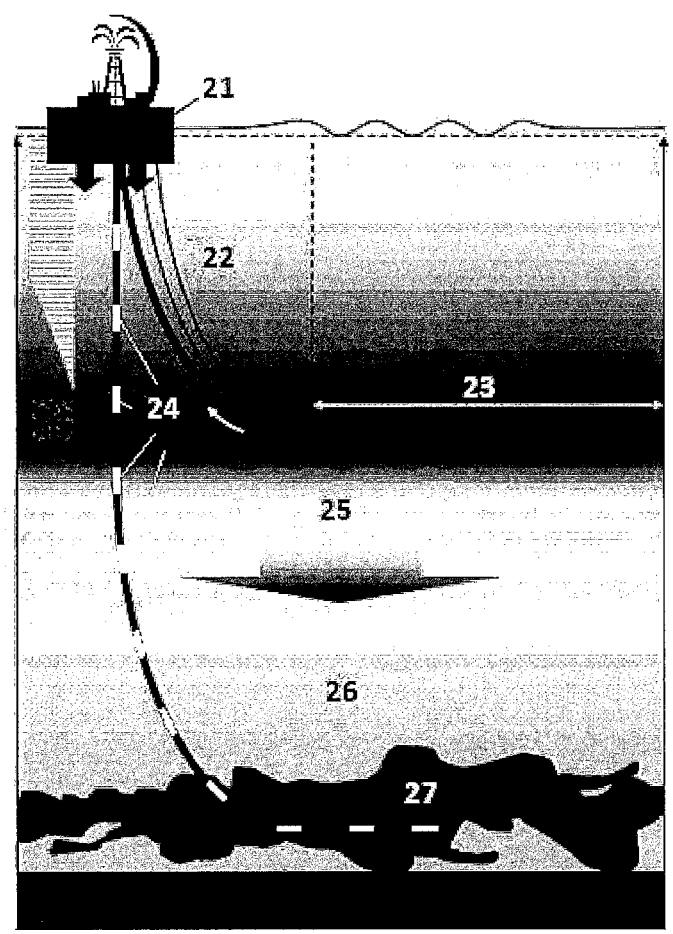
FIG. 5: view of the utilization of graphene-based steel risers for oil transportation from an exploration platform (21), thrown into the sea in free catenary riser (22) and (23), said coated riser by a luminescent coating layer that serves as depth "geo-marker" (24), for example, through the deep water of the post-salt (25), salt (26) and pre-salt (27) layers, until reach the oil in pre-salt layer in a deep between 5000 and 7000 meters (e.g. in the Santos Basin, Brazil).

In this patent, the preferential use of graphene-based steel tubes, pipes or risers is characterized by being applied to transport oil, gas and biofuels, as illustrated in FIG. 5. This utilization of these graphene-based structures includes uses such as drilling, completion, production, injection or transport of oil, gas or biofuels. Another exclusive utilization, when coated with luminescent layer, refers to the use as "geo-markers" of distance and/or depth.

The use is also characterized by being implemented as part of a more complex product or component, such as: pipelines; gas pipelines; rigid or flexible risers; subsea risers for ultra deep water (>1500 m); subsea connections; piping connections in "T", "J", "L", "H" or "U" shapes; machined threads; subsea components; columns; subsea facilities; wells; oil storage tanks; oil production facilities; drilling rigs; semi-submersibles; accommodation; heliports; umbilical; components of ships and oil tankers; towers; covered platforms; mobile offshore drilling units.

c) Utilization for Medical, Biomedical and Hospitalar Uses

Another use of graphene-based steel tubes, pipes or risers consists in their application as part of instruments, equipment or medical devices, biomedical, or for hospital use, including use as a biomaterial. For example, a graphene-based steel tube coated with an antibacterial $TiO_2$-based layer, said layer obtained by physical vapor phase deposition (PVD) that can be used for the transport of oxygen gas in outside pipelines or medical equipments, in operating rooms of hospital environments, for a better hygiene control in antiseptic use.

INDUSTRIAL APPLICABILITY

In addition to the preferred use in the oil, gas and biofuels industry, the present invention has applicability in the steel and metallurgical industries. Since they met the requirements of quality and safety levels characteristic of the graphene-based steel tubes, pipes or risers, they have industrial application extended to many other uses, such as:

graphene-based steel pipes for conducting fluid (e.g. water, gas, steam, compressed air, non-corrosive fluids);
graphene-based steel pipes for conduits (e.g. conducting wires and cables, including optical fiber coating);
graphene-based steel pipes for structural use (e.g. building system construction, scaffolding, fences, cages);
graphene-based steel pipes for mechanical use (e.g. in industrial extruder);
high precision graphene-based steel pipes (e.g. use in the automotive industry, aeronautics and aerospace);
graphene-based steel tubes for heat exchange (e.g. use in boilers, condensers and heat exchangers);
graphene-based steel pipes to conduct food (e.g. use in silos, transportation, meals and drinks).

Those products, safeguarding these specifications of chemical composition, geometry, surface finish and mechanical strength defined in the present invention, are widely used in general use.

Some examples are designed to facilitate the understanding of the present invention. It should be noted that the invention is not limited to the subject matter described and illustrated, but particularly to what is claimed.

EXAMPLES

Example 1

Method of manufacturing a graphene-based steel riser with chrome surface, which comprises the following steps:
i) to make the precursor mixture of graphene sheets by 0.2% (C, wt %) with surface area of 2300 m²/g, and average size (lateral) of 30 μm, and add (wt %) 0.08% Si; 0.02% Al; 0.2% N, 0.03% Nb; 2.0% Mn; 0.8% Ni; 0.01% Ti; 0.07% V; 0.1% Mo; 0.8% Cr; 0.001% Cu; and Fe balanced;
ii) heat treating the graphene-based steel mixture in arc furnace at a temperature of 1200-3000 K, said heat treatment that produces at least the austenite;
iii) to effect the conformation of the tubular geometry by hot rolling with a diameter of 2000 mm (outer wall), and wall thickness of 3.0 mm;
iv) to make the blasting of the tube surface with granules of graphene (average size of 30 μm) and $CrO_3$ (average size of 50 μm) combined in the ratio (1:1), whose jets are released under pressure of 1.0 MPa for 200 s at a distance of 70 mm between the jet nozzle and the pipe;
v) to make the coating of the blasted surface with $CrO_3$ layer by chemical vapor deposition (CVD), at a distance between the surface and the target tube of 100 mm, under alternating bias voltage of +180 V for 4 h, at 0.7 A in reducing atmosphere.

Result: graphene-based steel riser with chrome surface and 0.2% carbon content (wt %).
Utilization: use for oil transport in offshore submarine system to 5000 meters deep-sea.

Example 2

Method of manufacturing a luminescent graphene-based steel pipeline, which comprises the following steps:
i) to make the precursor mixture of graphene sheets 0.90% (C, wt %) with surface area of 1200 m²/g and average size (lateral) of 15 μm, and add (wt %): 0.03% Si; 0.02% Al; 0.2% N, 0.03% Nb; 2.0% Mn; 0.8% Ni; 0.01% Ti; 0.06% V; 0.1% Mo; 0.8% Cr; 0.001% Cu; and Fe balanced;
ii) heat treating the graphene-based steel mixture in arc furnace at a temperature of 1500-1773 K;
iii) to effect the conformation of the circular tube geometry by hot rolling with a diameter of 150 mm (outer wall), with wall thickness of 1.27 mm;
iv) to make the blasting of the tube surface with granules of graphene (average size of 50 μm), whose jets are released under pressure of 1.0 MPa for 150 s at a distance of 60 mm between the jet nozzle and the pipe;
v) to make the coating of the blasted surface with $SrAl_2O_4$:Ce, Dy coating layer by chemical vapor deposition (CVD), at a distance between the surface and tubular target of 70 mm under alternating bias voltage of +90 V, for 2 h at 0.5 A, in an inert atmosphere.

Result luminescent graphene-based steel pipeline with carbon content of 0.90% (wt %).
Utilization: luminescent pipeline to transport gas in underground environments (e.g. garage building).

Example 3

Method of manufacturing an ultrathin graphene-based steel tube with antibacterial surface blasted with $TiO_2$, which comprises the following steps:
i) to make the precursor mixture of graphene sheets 0.03% (C, wt %) with surface area of 2000 m²/g and average size (lateral) of 10 μm, and add (wt %): 0.17% Si; 0.021% Al; 0.63% N, 0.052% Nb; 0.56% Mn; 0.20% Ni; 0.013% Ti; 0.03% V; 0.13% Mo; 0.12% Cr; 0.002% Cu; and Fe balanced;
ii) heat treating the graphene-based steel mixture in plasma arc furnace at a temperature of 1200-2500 K, said heat treatment that produces at least the austenite;
iii) to effect the conformation of tubular square profile geometry 300×300 mm (outer wall) and wall thickness of 500 μm by hot rolling and folding;
iv) to make the blasting of the tube surface with granules of graphene (average lateral size of 20 μm) and $TiO_2$ shots (average size of 30 μm), combined in the ratio (1:1), whose jets are released under pressure of 0.5 MPa for 200 s, 100 mm distance between the jet nozzle and the pipe;
v) to make the coating of the blasted surface with a $TiO_2$ layer by physical vapor phase (PVD) at a distance between the tubular surface and target of 60 mm under AC bias voltage of +150 V for 2 h to 0.9 A, in an Argon atmosphere.

Result: ultrathin antibacterial graphene-based steel tube with 300×300 mm square profile and 0.03% carbon content (wt %).
Utilization: pipeline for the transport of oxygen gas in hospitalar building.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:
1. A graphene-based steel tube, pipe, or riser, comprising:
(a) the graphene-based steel having a chemical composition including graphene, the graphene providing a carbon content between 0.01 and 21.0%, wherein all percentages are by weight relative to a total weight of the graphene-based steel, the graphene in a form of nanosheets with a surface area from 60 to 2630 m²/g and lateral size between 3.0 and 100 μm, and wherein the graphene is functionalized by at least one functional group selected from the group consisting of —COOH, —NO, —NH$_2$, —CN, —CCH, —CH$_3$, —CaC$_6$, —YbC$_6$, —C$_6$OH$_2$, —OH, —H, —F, —HCl, —HF, —F$_2$, and —NHNH$_2$, and linked to main alloying elements or Fe atoms of the graphene-based steel;
(b) a microstructure formed by the graphene nanosheets and one of ferrite, austenite, iron carbide (Fe$_3$C), perlite, martensite, carbon nanotubes, carbon fibers, nanodiamond, fullerenes, and graphite, or a combination thereof;
(c) a tubular geometry with a wall thickness between 800 nm and 80 mm, and an outer diameter ranging between 10 and 5000 mm; and
(d) a shot peened surface derived from graphene shot.
2. The tube, pipe, or riser of claim 1, wherein the main alloying elements are present in the graphene-based steel in amounts varying from 0.01-0.3% Al, 0.01-2.0% Co, 0.01-

2.0% Cu, 0.1-18.0% Cr, 0.1-3.0% Mn, 0.1-0.6% Mo, 0.1-3.0% Ni, 0.01-0.8% Si, 0.1-3.0% W, 0.01-0.1% V, whose contents can vary from specifications of API 5L X50, X52, X60, X65, X70, X80, X90, X100 and X120, 2H, 2Y, AISI 1010, 1020, 1040, 1080, 1095, A36, A516, A440, A633, A656, 4063, 4340, 6150, ASTM A285 grade, A387, A515, A516, A517, grade BSI 4360, DIN EN 10208-2, or chosen from a different steel specification, accepting additional alloying elements up to 0.8% N, 0.25% Nb, 0.006% Ca, and 0.03% Ti.

3. The tube, pipe, or riser of claim 1, wherein a cross-sectional shape of the tubular geometry is one of circular, elliptical, triangular, square, rectangular, pentagonal, and hexagonal, or another polyhedral geometry.

4. The tube, pipe, or riser of claim 1, wherein the shot peened surface is derived from the graphene shot in combination with other shot formed from one of aluminum, silicon, titanium, chromium, tungsten, oxides thereof, and diamond, or a combination thereof.

5. The tube, pipe, or riser of claim 1, wherein the shot peened surface is further coated with a multifunctional coating layer of thickness between 30 nm and 5.0 mm, wherein the multifunctional layer is at least one of graphene-based and made by a combination of:
  i) one of ZrN, CrN, VC, $Li_3BO_3$, $MgBr_2$, $CaF_2$, $SiO_2$, $CrO_3$, $Cr_2O_3$, WC, $WO_3$, $WO_4$, $Al_2O_3$, and diamond, or a combination thereof, wherein the multifunctional layer is at least one of resistant to corrosion, resistant to chemical attacks, and a thermal insulator;
  ii) a metal-earth aluminate doped with a lanthanide ion (Ln), comprising $MAl_2O_4$:Ln, $M_3Al_2O_6$:Ln, $M_4Al_{14}O_{25}$:Ln, wherein M is one of Be, Mg, Sr, Ba and Ca, and wherein the multifunctional layer is luminescent; and
  iii) one of TiN, TiAlN, TiC, TiCN, TiBN, $TiB_2$, $TiO_2$, $AgNO_3$, Ag, and Au, or a combination thereof, wherein the multifunctional layer is antibacterial.

6. The tube, pipe, or riser of claim 1, wherein the carbon content is between 0.01 and 0.20%.

7. The tube, pipe, or riser of claim 1, wherein the graphene-based steel further includes 0.17% Si, 0.021% Al, 0.63% N, 0.052% Nb, 0.56% Mn, 0.20% Ni, 0.013% Ti, 0.03% V, 0.13% Mo, 0.12% Cr, 0.002% Cu, and the remainder Fe.

8. A method for the production of a graphene-based steel tube, pipe, or riser, the method comprising the steps of:
  (a) mixing powders in a chemical composition for the graphene-based steel to provide a mixture including graphene, the graphene providing a carbon content between 0.01 and 21.0%, wherein all percentages are by weight relative to a total weight of the graphene-based steel, the graphene in a form of nanosheets with a surface area from 60 to 2630 $m^2/g$ and lateral size between 3.0 and 100 μm, and wherein the graphene is functionalized by at least one functional group selected from the group consisting of —COOH, —NO, —$NH_2$, —CN, —CCH, —$CH_3$, —$CaC_6$, —$YbC_6$, —$C_6OH_2$, —OH, —H, —F, —HCl, —HF, —$F_2$, and —$NHNH_2$, and linked to main alloying elements or Fe atoms of the graphene-based steel;
  (b) heat treating the mixture obtained in step (a) at a temperature between 1000 and 3773 K to sinter or melt the mixture and produce at least the formation of an austenite phase to provide the graphene-based steel, followed by a cooling of the graphene-based steel;
  (c) forming a tubular geometry with the graphene-based steel from step (b) by a cold process or a hot process, the tubular geometry having a wall thickness between 800 nm and 80 mm, and an outer diameter ranging between 10 and 5000 mm;
  (d) surface finishing the graphene-based steel in the tubular geometry by shot peening a surface of the graphene-based steel with graphene shot.

9. The method of claim 8, further comprising a step of covering the shot peened surface with a multifunctional coating layer, the multifunctional layer having a thickness between 30 nm and 5.0 mm and formed from at least one of graphene and a combination of: one of ZrN, CrN, VC, $Li_3BO_3$, $MgBr_2$, $CaF_2$, $SiO_2$, $CrO_3$, $Cr_2O_3$, WC, $WO_3$, $WO_4$, $Al_2O_3$, and diamond, or a combination thereof; a metal-earth aluminate doped with lanthanide ions (Ln), comprising $MAl_2O_4$:Ln, $M_3Al_2O_6$:Ln, $M_4Al_{14}O_{25}$:Ln, wherein M is one of Be, Mg, Sr, Ba and Ca; and at least one of TiN, TiAlN, TiC, TiCN, TiBNi $TiB_2$, $TiO_2$, $AgNO_3$, Ag, and Au.

10. The method of claim 8, further comprising the step of performing the nanofunctionalization of the graphene nanosheets before their addition to the chemical composition, the nanofunctionalization including a heat treatment between 120 and 400° C.

11. The method of claim 8, wherein the concentration of the main alloying elements in step (a) are selected from one of following specifications: API 5L X50, X52, X60, X65, X70, X80, X90, X100, X120, 2H, or 2Y, AISI 1010, 1020, 1040, 1080, 1095, A36, A516, A440, A633, A656, 4063, 4340, 6150, ASTM A285 grade, A387, A515, A516, A517, BSI 4360 grade, and DIN EN 10208-2.

12. The method of claim 8, wherein step (a) further accepts adding a supplementary alloying element including up to 0.8% N, 0.25% Nb, 0.006% Ca, or 0.03% Ti.

13. The method of claim 8, wherein the graphene-based steel has a microstructure formed by the graphene nanosheets and one of ferrite, austenite, iron carbide ($Fe_3C$), perlite, martensite, carbon nanotubes, carbon fibers, nanodiamond, fullerenes, and graphite, or a combination thereof.

14. The method of claim 13, wherein the graphene-based steel contains up to 0.01% of carbon from $Fe_3C$ linked to one of graphene and allotropes of carbon, or a combination thereof.

15. The method of claim 8, wherein the sintering or melting of the powder mixture in step (b) is started from a solid phase or a liquid phase.

16. The method of claim 8, wherein the tubular geometry is made by one of lamination, extrusion, forging, drawing, deep drawing, stretching, bending, shear, puckering, machining, casting, spinning, and injection molding, or a combination thereof.

17. The method of claim 8, wherein the tubular geometry is one of seamless or seamed, with a region of one of elastic and plastic deformation.

18. A method for the use of steel tube, pipe or riser for conveying petroleum, gas or biofuels in onshore or offshore systems, the method comprising the steps of:
  providing the tube, pipe, or riser formed from the graphene-based steel, including (a) the graphene-based steel having a chemical composition including graphene, the graphene providing a carbon content between 0.01 and 21.0%, wherein all percentages are by weight relative to a total weight of the graphene-based steel, the graphene in a form of nanosheets with a surface area from 60 to 2630 $m^2/g$ and lateral size between 3.0 and 100 μm, and wherein the graphene is functionalized by at least one functional group selected from the group consisting of —COOH, —NO, —$NH_2$, —CN, —CCH, —$CH_3$, —$CaC_6$, —$YbC_6$, $C_6OH_2$, —OH, —H, —F, —HCl, —HF, —$F_2$, and —$NHNH_2$, and linked to main alloying elements or Fe atoms of the graphene-based steel, (b) a microstructure formed by the graphene nanosheets and one of ferrite, austenite, iron carbide ($Fe_3C$), perlite, martensite, carbon nanotubes, carbon fibers, nanodiamond, fullerenes, and graphite, or a combination thereof, (c) a tubular geometry with a wall thickness between 800 nm and 80 mm, and an outer diameter ranging between 10 and 5000 mm, and (d) a shot peened surface derived from graphene shot; and using the tube, pipe, or riser for the drilling, completion, production, injection or exportation of the petroleum, gas or biofuels, or as geo-markers of distance and depth of submarine water.

19. The method of claim 18, wherein the tube, pipe, or riser is used as part of: a pipeline; a gas pipeline; a rigid or flexible riser; a submarine connection; a tubular connections in a "T", "J", "L", "H" or "U" shape; a machined thread; a subsea component; a column; a submarine facility; a water well; an oil storage tank; a structure of oil production; a drilling platform; a semi-submersible; an accommodation; a helipad; an umbilical; a component of a ship and oil tanker; a tower; a covered platform; or a mobile offshore drilling unit.

20. The method of claim 18, wherein the tube, pipe, or riser is sectioned to provide standardized or non-standardized specimen (SP) samples for mechanical tests to evaluate structural integrity with at least one of the following features: pre-crack, specimen width of 55 mm; distance between axis of holes for loading pins of 114 mm; radius of curvature of SP of 10 mm; wall width of 32 mm; distance from the SP edge to the center of the holes of 31 mm; straight section to the center of the hole equal to 19 mm; length of the base of 50 mm; total SP length equal to 176 mm; straight section to the crack center equal to 28 mm; radius of curvature of the base equal to 10 mm; or specimen thickness between 2.0 and 15 mm.

* * * * *